(12) United States Patent
Ripley

(10) Patent No.: US 7,621,672 B2
(45) Date of Patent: Nov. 24, 2009

(54) THERMOCOUPLE SHIELD

(75) Inventor: Edward B. Ripley, Knoxville, TN (US)

(73) Assignee: Babcock & Wilcox Technical Services Y-12, LLC, Oak Ridge, TN (US)

( * ) Notice: Subject to any disclaimer, the term of this patent is extended or adjusted under 35 U.S.C. 154(b) by 163 days.

(21) Appl. No.: 11/687,820

(22) Filed: Mar. 19, 2007

(65) Prior Publication Data
US 2008/0232428 A1 Sep. 25, 2008

(51) Int. Cl.
G01K 1/00 (2006.01)
G01K 7/00 (2006.01)
G01K 13/00 (2006.01)

(52) U.S. Cl. .................. 374/208; 374/141; 374/179; 136/230

(58) Field of Classification Search .............. 374/208, 374/141, 179; 136/230
See application file for complete search history.

(56) References Cited

U.S. PATENT DOCUMENTS

| 4,746,534 | A | | 5/1988 | Phillippi et al. | |
|---|---|---|---|---|---|
| 5,999,081 | A | * | 12/1999 | Hannigan et al. | 338/28 |
| 6,169,244 | B1 | * | 1/2001 | Carlos et al. | 136/201 |
| 7,056,013 | B2 | * | 6/2006 | Anderson et al. | 374/138 |
| 7,080,941 | B1 | * | 7/2006 | Benjamin et al. | 374/179 |
| 7,416,332 | B2 | * | 8/2008 | Rountree et al. | 374/152 |

FOREIGN PATENT DOCUMENTS

JP 2007-17212 1/2007

WO WO 92/02794 2/1992

OTHER PUBLICATIONS http://www.universal-thermosensors.co.uk/thermocouples/tc-front-page.htm, Thermocouple Introduction, Universal Thermosensors Limited, Castle Road Technical Centre, Murston, Sittingbourne, Kent. ME10 3RG, United Kingdom (8 pp.).

* cited by examiner

Primary Examiner—Lisa M Caputo
Assistant Examiner—Mirellys Jagan
(74) Attorney, Agent, or Firm—Michael J. Renner; Luedeka, Neely & Graham, P.C.

(57) ABSTRACT

A thermocouple shield for use in radio frequency fields. In some embodiments the shield includes an electrically conductive tube that houses a standard thermocouple having a thermocouple junction. The electrically conductive tube protects the thermocouple from damage by an RF (including microwave) field and mitigates erroneous temperature readings due to the microwave or RF field. The thermocouple may be surrounded by a ceramic sheath to further protect the thermocouple. The ceramic sheath is generally formed from a material that is transparent to the wavelength of the microwave or RF energy. The microwave transparency property precludes heating of the ceramic sheath due to microwave coupling, which could affect the accuracy of temperature measurements. The ceramic sheath material is typically an electrically insulating material. The electrically insulative properties of the ceramic sheath help avert electrical arcing, which could damage the thermocouple junction. The electrically conductive tube is generally disposed around the thermocouple junction and disposed around at least a portion of the ceramic sheath. The concepts of the thermocouple shield may be incorporated into an integrated shielded thermocouple assembly.

18 Claims, 3 Drawing Sheets

THERMOCOUPLE SHIELD

GOVERNMENT RIGHTS

The U.S. Government has rights to this invention pursuant to contract number DE-AC05-00OR22800 between the U.S. Department of Energy and BWXT Y-12, L.L.C.

FIELD

The invention is generally related to thermocouples and more particularly to the protection of thermocouples when used in an RF (radio frequency) energy field.

BACKGROUND

Thermocouples are used to measure temperature by converting thermal energy into a change in electrical resistance at a junction between two specially selected materials. This change in resistance allows an electronic measurement of the temperature of a thermal region of interest based upon the electrical resistance of the thermocouple junction. The thermal region of interest may be, for example, (a) a thermally sensitive region on the surface of a piece of equipment, (b) a temperature monitoring location for a material being thermally processed, or (c) an environmentally sensitive region in a body of fluid.

It is often desirable to use thermocouples to measure temperatures in an environment that includes microwave energy, such as in a microwave oven, or in an environment that includes other radio frequency energy, such as in a traveling wave tube or other electronic device. Hereinafter the terms "radio frequency field(s)" and "RF field(s)" will be used to refer to electromagnetic fields (EMF) that range from approximately 9 kHz to several thousand GHz—a range that includes both conventional "radio" frequencies and microwave frequencies. Also, the terms "radio frequency range" and "range of radio frequencies" will be used to refer to the same range of frequencies: approximately 9 kHz to several thousand GHz. Applications of thermocouples in RF fields at conventional microwave thermal processing frequencies (e.g., 915 MHz and 2.45 GHz) are of particular interest.

As will be appreciated by one of skill in the art, either a bare thermocouple (thermocouple junction with lead wires) or a thermocouple probe (a bare thermocouple encased in a jacket) may be used as a "thermocouple device" to measure temperatures. When measuring temperatures in an RF field, the bare thermocouple or the thermocouple probe tends to concentrate electrical fields which in turn perturbs the RF field. This concentration of the electrical fields may result in arcing and/or heating of the thermocouple junction, the probe or the probe tip. This heating may cause the thermocouple device to register a temperature that is higher than the actual temperature of the target subject. Also, because of this heating, it is not uncommon for the thermocouple device to fail at the thermocouple junction when placed in a high energy RF field. What are needed therefore are designs that overcome these and other deleterious effects of RF fields that are experienced by conventional thermocouple devices.

SUMMARY

One embodiment provides a thermocouple shield for shielding a thermocouple device from a radio frequency (RF) field in an RF processing chamber at an operating temperature "T." The thermocouple device has a maximum width "W" and has a thermocouple junction with a length "L." The thermocouple shield includes an electrically conductive tube that has at least minimal structural integrity at the temperature "T." The electrically conductive tube has a substantially cylindrically-shaped section and a closed end and an open end. The cylindrically-shaped section has an outside diameter greater than approximately two times "W," and has an un-insulated bore with a bore diameter not less than approximately "W," and has a bore length that is greater than approximately two times "L."

An embodiment of a thermocouple shield for shielding a thermocouple probe from a radio frequency field is also provided, where the thermocouple probe has an electrically conductive jacket with a tip end surrounding a thermocouple junction, and where the thermocouple probe has a maximum diameter "D." The thermocouple shield has an electrically conductive tube having a tube bore, a closed end and an open end. There is a ceramic sheath disposed within the tube bore, and the ceramic sheath has a sheath bore with a sheath-bore inside diameter not less than "D."

A shielded thermocouple assembly for use in an RF processing chamber is provided in a further embodiment. The shielded thermocouple assembly has a thermocouple having a thermocouple junction. There is a ceramic sheath surrounding at least a portion of the thermocouple. The ceramic sheath is electrically insulating and substantially transparent to a radio frequency field. An electrically conductive tube is disposed around the thermocouple junction and disposed around at least a portion of the ceramic sheath.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred embodiments, reference is made to the accompanying drawings, which form a part hereof, and within which are shown by way of illustration the practice of specific embodiments of thermocouple shields for use in a radio frequency energy field. It is to be understood that other embodiments may be utilized, and that structural changes may be made and processes may vary in other embodiments.

As previously indicated, conventional thermocouple devices (bare thermocouples or thermocouple probes) tend to concentrate electrical fields when they are used to measure temperatures in an RF field. This concentration of the electrical fields may result in arcing and/or heating of the thermocouple junction, or the probe tip or the entire probe. Two factors have been identified that influence this effect in thermocouple probes: the geometry of the probe tip and the diameter of the probe. First, the smaller the diameter of the probe tip or the sharper the probe's tip, the more this effect is accentuated. Second, the smaller the diameter of the thermocouple jacket, the more this effect is accentuated. In embodiments where a thermocouple is un-jacketed (i.e., a bare thermocouple), the smaller the diameter of the thermocouple junction or the radius of the junction tip, the higher the arcing and/or heating effect of the RF field is on the thermocouple.

As a general rule the thermocouple junctions on commercially available bare thermocouples are on the order of ⅛ of an inch or smaller in diameter. Generally, the diameter of jacket of a thermocouple probe is also on the order of ⅛ of an inch or smaller and no particular attention is paid to the shape of the tip. Many times the end of the shielded thermocouple will be slightly flattened and the corner between the side and end will have a small radius. When such a tip is placed in an RF field, the field is perturbed and energy is concentrated primarily at the small radius of the end, and along the narrow diameter as well. Two deleterious effects occur when this happens. First, the end of the thermocouple (where the thermocouple junction is located) is heated by this concentrated RF field. As a result, the thermocouple registers a higher than actual temperature for the target subject. The second deleterious effect is that the perturbed field may cause sufficient energy concentration at or near the tip to allow arcing between the thermocouple tip and any conductive materials near the tip. This often will also cause rapid heating and also result in an erroneously high reading. Such arcing may also result in failure of the thermocouple device.

Figure 1:
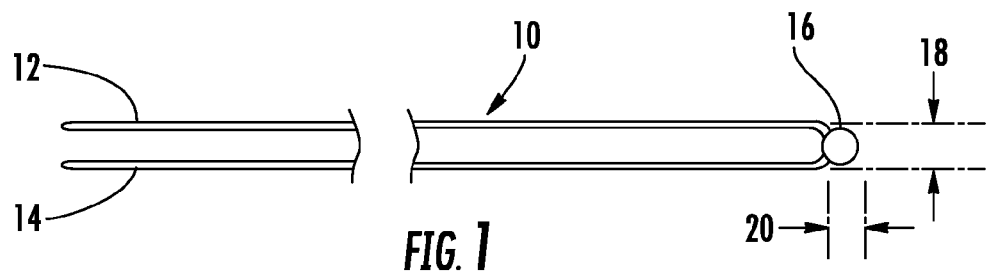
FIG. 1 provides a somewhat schematic side view of a bare thermocouple.

FIG. 1 illustrates a basic commercially-available thermocouple 10 which, as purchased off the shelf, is generally unsuitable for use in high power RF fields (i.e., RF fields of approximately 500 watts or higher). However, the thermocouple 10 may be modified according to various embodiments described herein for use in such environments. The thermocouple 10 includes a first lead 12 and a second lead 14 that are each connected to a thermocouple junction 16. The thermocouple junction 16 is formed from two different selected complementary materials (such as tungsten and rhenium) that when joined together create a sensor that changes its electrical resistance depending upon the ambient temperature at the thermocouple junction. The thermocouple 10 has a width 18, and the thermocouple junction 16 has a length 20, both dimensions being typically on the order of ⅛ inch.

Figure 2:
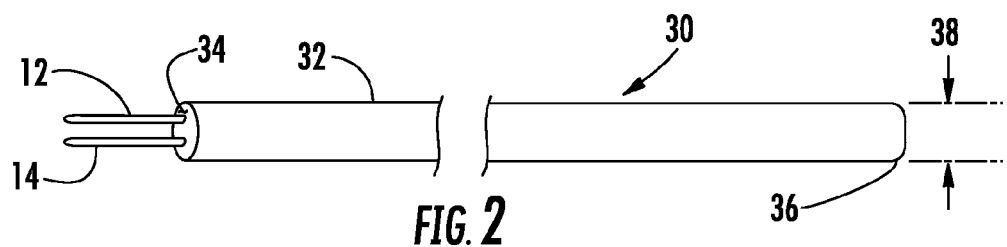
FIG. 2 provides a somewhat schematic side view of a thermocouple probe.

Often bare thermocouples are packaged in a jacket to protect the leads and the thermocouple junction from physical damage. As previously indicated, such jacketed thermocouples are referred to as thermocouple probes. For example, FIG. 2 illustrates a thermocouple probe 30 that includes a jacket 32 that encloses the thermocouple 10 of FIG. 1. The jacket 32 has a tip end 36 that surrounds the thermocouple junction 16 of the thermocouple 10. The jacket 32 has an outside diameter 38 which is typically on the order of ⅛ inch. The jacket 32 is generally fabricated from electrically conductive material, typically from a metal such as stainless steel. To prevent the leads 12 and 14 and the thermocouple junction 16 from shorting out to the jacket 32, the jacket 32 is filled with a suitable ceramic insulating material 34 that is configured to electrically isolate the thermocouple 10 from the jacket 32. Magnesium oxide is a suitable material for use as the ceramic insulation material 34.

The bare (unjacketed) thermocouple 10 illustrated in FIG. 1 and the thermocouple probe 30 illustrated in FIG. 2 are both examples of thermocouple devices.

Various embodiments described herein provide a shield to at least partially surround a thermocouple device and protect it from high energy RF fields. In the case of a bare thermocouple, the thermocouple shield typically serves two important functions. First, it significantly increases the diameter of the structure exposed to the RF field, and that improved geometry decreases the amount of perturbation of the RF field. Second, it shields the thermocouple junction from RF energy that may damage the thermocouple.

Figure 3:
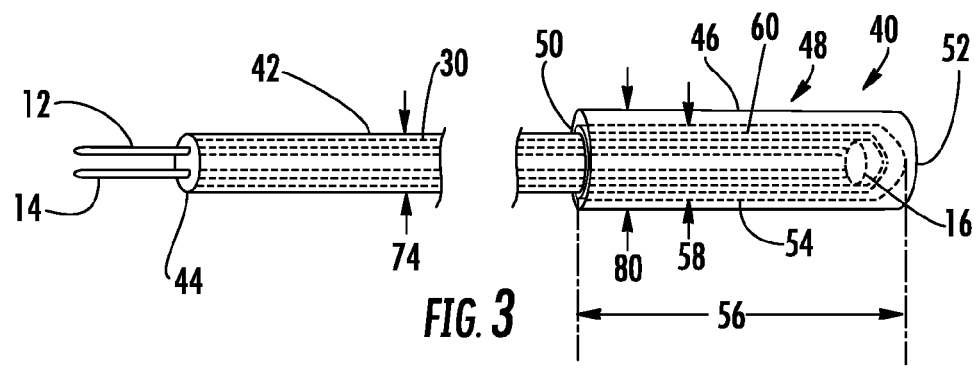
FIG. 3 illustrates a somewhat schematic side view of an embodiment employing an electrically conductive tube surrounding portions of a ceramic sheath containing a thermocouple.
Figure 4:
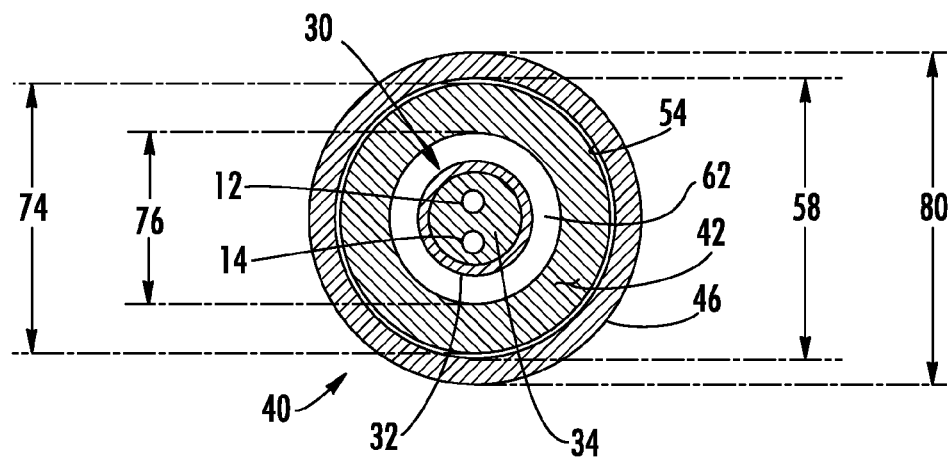
FIG. 4 is a somewhat schematic section view of the embodiment of FIG. 3.

FIGS. 3 and 4 illustrate shielded thermocouple 40, which is an embodiment of a shielded thermocouple employing a thermocouple probe. The shielded thermocouple 40 has a ceramic sheath 42. The ceramic sheath 42 has an accessible end 44 where the thermocouple leads 12 and 14 protrude and are available for connection to resistance measurement circuitry. In applications where the thermocouple is used in an RF processing chamber, such as a microwave oven, the thermocouple leads 12 and 14 may be surrounded by a conductive shielding material that is grounded to the chamber so that the thermocouple leads do not provide an RF leak path by conducting RF energy out of the chamber and acting as an antenna that radiates the RF energy.

The ceramic sheath 42 is generally selected from a material that does not couple with or absorb RF energy over the temperature range for which the thermocouple is designed for use. That is, the ceramic sheath 42 is generally selected to be substantially transparent to RF energy for the wavelength of energy used over the range of operating temperature for which the thermocouple assembly is designed for use. Because the ceramic sheath 42 is substantially transparent to such energy, the ceramic sheath 42 is not significantly heated by the radio frequency or microwave energy to which it is exposed. Preferably the material used to construct the ceramic sheath 42 is further selected to be an electrically insulating material. The electrically insulative properties of the ceramic sheath help avert electrical arcing, which can damage a thermocouple junction. Examples of suitable materials for the ceramic sheath 42 include but are not limited to aluminum oxide, boron nitride, and silicon dioxide. Additional examples of suitable materials include oxide, nitride, silicide, boride, phosphide, and sulphide ceramics.

In this embodiment of FIG. 3, an insertion section 60 of the ceramic sheath 42 is substantially enclosed by an electrically conductive tube 46. The electrically conductive tube 46 has a cylindrically-shaped section 48, an open end 50, a closed end 52, and a bore 54. The bore 54 has a bore length 56 and a bore diameter 58. The insertion section 60 of the ceramic sheath 42 is inserted through the open end 50 of the electrically conductive tube 46 so that it extends from the open end 50 into the bore 54 nearly to the closed end 52 of the electrically conductive tube 46. The ceramic sheath 42 is an example of an electrical insulator configured for preventing at least a portion of a thermocouple device (such as the leads 12 and 14 of the thermocouple 10) from touching a bore (such as the bore 54 illustrated in FIGS. 3 and 4). The thermocouple junction 16 of a thermocouple 10 extends into the bore 54 nearly to the end of the insertion section 60. This configuration where the thermocouple junction 16 extends into the bore 54 of the electrically conductive tube 46 is an example of a configuration where the electrically conductive tube 46 is disposed around the thermocouple junction 16.

The electrically conductive tube 46 is typically long enough that the length 56 of the bore 54 is at least twice as long as the length 20 of the thermocouple junction 16. More typically, to more completely shield the junction of the thermocouple from the RF field, the length of the electrically conductive tube 46 is long enough so that the length 56 of the bore 54 is at least ten times the length 20 of the thermocouple junction 16. It is usually only necessary to shield approximately the first two inches of the tip of the thermocouple 10 to be effective. In some embodiments the electrically conductive tube 46 may be extended all the way to the accessible end 44 of the ceramic sheath 42.

Typically the closed end 52 of the electrically conductive tube 46 is rounded in a somewhat hemispherical shape. The open end 50 is typically formed in a smooth annular shape. The electrically conductive tube 46 is typically formed from metal such as stainless steel. The material that forms the electrically conductive tube 46 should have an operating temperature well above the normal operating temperature range of the chamber in which the thermocouple is used and also should be compatible with the chamber atmosphere. Typically the electrically conductive tube 46 is constructed of metal that has at least minimal structural integrity at a temperature "T" at which the electrically conductive tube will be exposed. Minimal structural integrity, as used herein, refers to a 1 ksi (7 MPa) yield strength at the temperature "T."

If the electrically conductive tube 46 extends the full length of the ceramic sheath 42 and the shielded thermocouple 40 is used in an RF chamber (such as a microwave oven), it may be useful to electrically couple the electrically conductive tube 46 to the RF chamber. The electrical coupling of the electrically conductive tube 46 to the RF chamber mitigates a potential problem where the electrically conductive tube 46 might act as an antenna to propagate RF energy outside the chamber.

As seen in FIG. 4, an air gap 62 may be provided between the jacket 32 of the thermocouple probe 30 (identified in FIG. 3) and the ceramic sheath 42 of the shielded thermocouple 40 (identified in FIG. 3). To enhance the legibility of FIG. 3, the air gap 62 of FIG. 4 is not depicted in FIG. 3.

As depicted in FIGS. 3 and 4, the electrically conductive tube 46 has a cylindrical shape with an outside diameter 80. In many embodiments where the electrically conductive tube 46 is not substantially transparent to microwaves, such as where the electrically conductive tube 46 is metal, the outside diameter 80 is often greater than approximately two times the width 18 of the thermocouple 10 (FIG. 1). In some embodiments the outside diameter 80 may, for example, be two and one half times, or three times, or four times, or five times, or six times, or seven times, eight times, or even a higher multiple of the width 18 of the thermocouple 10. This means that the outside diameter 80 is often greater than approximately ¼ inch. In some embodiments the outside diameter 80 of the electrically conductive tube 46 may, for example, be 5/16 inch, or ⅜ inch, or 7/16 inch, or ½ inch, or ⅝, or ¾ inch, or ⅞ inch, one (1) inch or even larger. The amount of surface charge accumulating on an outside surface of a non-transparent circular cylinder (e.g., the electrically conductive tube 46) is proportional to $r^2/\lambda$ where r is the radius of the cylinder and $\lambda$ is the wavelength of the RF field. The minimum desirable outside diameters (e.g., 80) of such cylinders (e.g., 46) cited in this paragraph typically provide adequate tolerance for surface charge accumulation that are most likely to be encountered in thermocouple applications over the radio frequency range.

As depicted in FIG. 4, the cylindrical cross sectional shape of the electrically conductive tube 46 is circular, but in alternative configurations the cross sectional shape of the electrically conductive tube 46 may be triangular, square, or of another geometric shape. However, when non-cylindrical shapes are used, the surface charge accumulation is dependent upon the radius of the smallest feature; therefore rounded edges are beneficial, and a completely circular cross section is the most beneficial.

As also depicted in FIG. 4 the ceramic sheath 42 has a sheath-bore inside diameter 76 and the electrically conductive tube 46 has a bore with a diameter 58. The bore diameter 58 of the electrically conductive tube 46 should be sized in conjunction with the outside diameter 80 to provide sufficient wall thickness for structural integrity. In embodiments where the ceramic sheath 42 is constructed of materials that are substantially transparent to RF energy at the frequency and temperature of application, the outside diameter 74 of the ceramic sheath 42 is not critical for reduction of perturbation of the RF field or concentration of energy as surface charges.

The outside diameter 74 of the ceramic sheath 42 should be sized to physically mate with the electrically conductive tube 46. In some embodiments this may mean that the outside diameter 74 of the ceramic sheath 42 (at the insertion end 60 of the ceramic sheath 42, as depicted in FIG. 3) is sized to snuggly fit inside the bore diameter 58 of the electrically conductive tube 46. In other embodiments the outside diameter 74 of the ceramic sheath 42 at the insertion end 60 may be sized to loosely fit inside the bore diameter 58 of the electrically conductive tube 46. The ceramic sheath 42 may be affixed to the electrically conductive tube 46 by a suitable bonding material.

Typically the sheath-bore inside diameter 76 of the ceramic sheath 42 is approximately not less than the outside diameter 38 of the jacket 32 before assembly with the thermocouple probe 30. In embodiments where the sheath-bore inside diameter 76 is equal to or even slightly less the outside diameter 38 of the jacket 32 before assembly, the ceramic sheath 42 may be assembled to surround the probe 30 by utilization of various techniques known in the art for mechanical interference fit assembly. In embodiments where the sheath-bore inside diameter 76 is larger than the outside diameter 38 of the jacket 32, the ceramic sheath 42 may be affixed to the thermocouple probe 30 by suitable bonding material.

Figure 5:
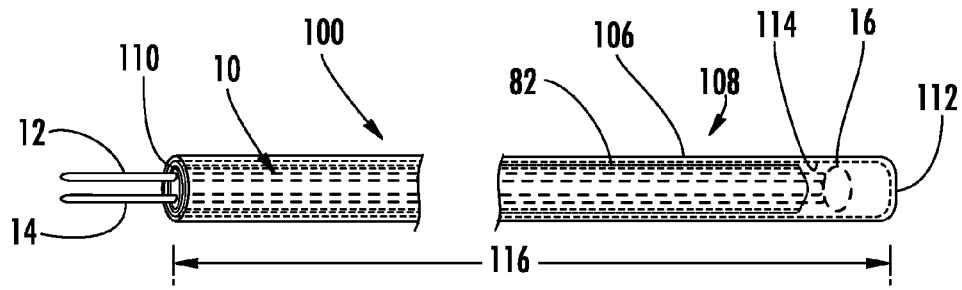
FIG. 5 illustrates a somewhat schematic side view of an embodiment with an electrically conductive tube entirely encasing a ceramic sheath enclosing a thermocouple.

FIG. 5 illustrates an alternate embodiment of a shielded thermocouple 100 for a bare thermocouple 10. An electrically conductive tube 106 having a cylindrically-shaped section 108, an open end 110, a closed end 112, and a bore 114 covers the entire length of a ceramic sheath 82. In this embodiment of FIG. 5, the ceramic sheath 82 is inserted into the bore 114 of the electrically conductive tube 106 nearly to the closed end 112 of the electrically conductive tube 106. The thermocouple junction 16 extends beyond the end of the ceramic sheath 82. This configuration where the thermocouple junction 16 extends into the electrically conductive tube 106 is a further example of a configuration where an electrically conductive tube (i.e., 106) is disposed around a thermocouple junction (i.e., 16).

The electrically conductive tube 106 of FIG. 5 typically has substantially the same material properties and geometry (except for its longer length 116) as the electrically conductive tube 46 also described hereinabove and depicted in FIGS. 3 and 4. In the embodiment of FIG. 5, the length 116 of the electrically conductive tube 106 is an order of magnitude longer than the length 20 (as depicted in FIG. 1) of the thermocouple junction 16. However, in some embodiments the length 116 of the electrically conductive tube 106 may be as short as two times the length 20 of the thermocouple junction.

The thermocouple junction 16 may be in electrical contact with the bore 114 of the electrically conductive tube 106. In some embodiments the thermocouple junction is bonded to the bore 114 of the electrically conductive tube 106 near the closed end 112 with electrically and thermally conductive material. In some embodiments the thermocouple junction 16 of the thermocouple 10 is bonded to the bore 114 of the electrically conductive tube 106 near the closed end 112 with electrically insulative but thermally conducting material to improve heat transfer from the electrically conductive tube 106 to the thermocouple junction 16. Silicon nitride is an example of an appropriate thermally conducting and electrically insulative material.

Some embodiments of a shielded thermocouple employ a configuration where there is no ceramic sheath. Instead, an electrically conductive tube (e.g., 46 of FIGS. 3 and 4 or 106 of FIG. 5) may be used to provide the shielding. In such embodiments and in embodiments where a portion of the leads 12 and 14 of the thermocouple 10 are unshielded by a ceramic sheath, it is important to prevent arcing in an RF environment and to prevent electrical short circuiting. One way to prevent such problems is to configure the shielded thermocouple so that the thermocouple leads 12 and 14 are not so close to each other or to the bore 114 of the electrically conductive tube 106 that the dielectric strength of the air (or other insulation) between these elements is exceeded, such that arcing can occur. It is also helpful in such applications to construct the thermocouple leads 12 and 14 of materials that are capable of withstanding high temperatures by, for example, protecting the thermocouple leads 12 and 14 with supplemental thermal insulation such as a ceramic (e.g., silica) fiber insulator.

Figure 6:
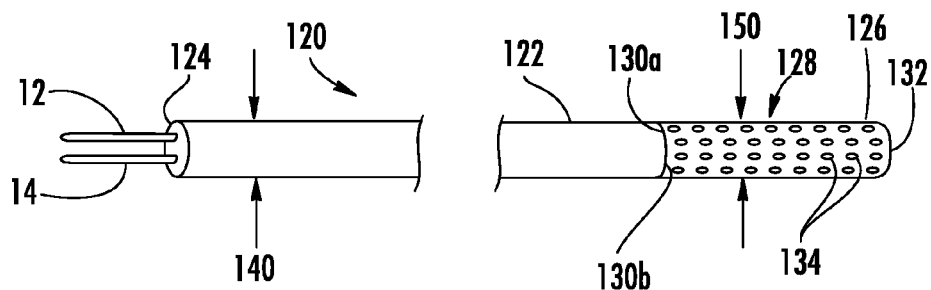
FIG. 6 illustrates a somewhat schematic side view of an embodiment having a perforated electrically conductive tube disposed at the end of a ceramic sheath.

FIG. 6 illustrates an alternate embodiment of a shielded thermocouple device 120. The shielded thermocouple device 120 has a nonconductive ceramic sheath 122 that includes an accessible end 124 from which the thermocouple leads 12 and 14 extend. The ceramic sheath 122 terminates at a distal end 130A. The ceramic sheath 122 has an outside diameter 140, and as with the diameter 74 of the ceramic sheath 42 depicted in FIG. 3, the size of outside diameter 140 of the ceramic sheath 122 is not critical for reduction of perturbation of the RF field or concentration of energy as surface charges.

An electrically conductive tube 126 is attached to the distal end 130A of the ceramic sheath 122. The electrically conductive tube 126 has a cylindrically-shaped section 128, an open end 130B, and a closed end 132. In the embodiment of FIG. 6 the electrically conductive tube 126 is formed of metal. In most embodiments the minimum desirable outside diameter 150 of the electrically conductive tube 126 is the same minimum desirable outside diameter previously described for the outside diameter 80 of the electrically conductive tube 46 depicted in FIG. 3. In the embodiment of FIG. 6, the outside diameter 140 of the ceramic sheath 122 and the outside diameter 150 of the electrically conductive tube 126 are approximately equal, and the open end 130B of the electrically conductive tube 126 is attached to the distal end 130A of the ceramic sheath 122 by butt-joint bonding. In alternative configurations the outside diameter 140 of the ceramic sheath 122 and the outside diameter 150 of the electrically conductive tube 126 may differ and the ceramic sheath 122 and the electrically conductive tube 126 may slide together for bonding. While there may be some small overlap between the open end 130B of the electrically conductive tube 126 and the distal end 130A of the ceramic sheath 122, terminating the ceramic sheath 122 at or near the start of the electrically conductive tube 126 prevents the thermal insulating properties of the ceramic sheath 122 from impeding the thermal response of the thermocouple.

In the embodiment of FIG. 6, the electrically conductive tube 126 has substantially the same material properties as the electrically conductive tube 46 described hereinabove and depicted in FIGS. 3 and 4, and as the electrically conductive tube 106 described hereinabove and depicted in FIG. 5. Typically the closed end 132 is rounded in a somewhat hemispherical shape and the open end 130B is typically formed in a smooth annular shape similar to the electrically conductive tube 46. However, in the embodiment of FIG. 6 the electrically conductive tube 126 is provided with a plurality of perforations 134. The perforations 134 are large enough to permit the interaction of ambient atmosphere surrounding the electrically conductive tube 126 with the thermocouple (and thereby facilitate a quick thermal response), and small enough to shield the thermocouple from the RF field. In most embodiments the perforations 134 are configured to cut off substantially all the high energy RF fields that the thermocouple will experience, using standard design principles for a waveguide beyond cutoff.

Figure 7:
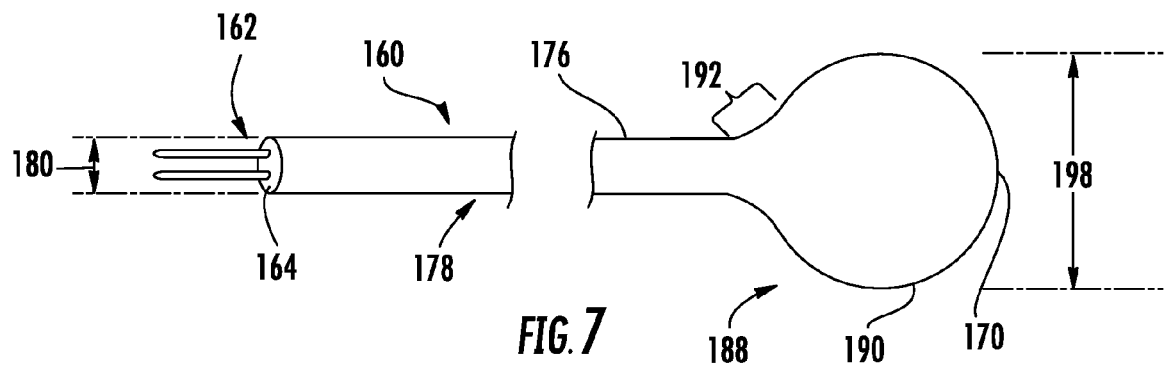
FIG. 7 illustrates a somewhat schematic side view of an embodiment having an electrically conductive tube with a bulbous end.

FIG. 7 illustrates an alternate embodiment of a shielded thermocouple device 160 that includes an electrically conductive tube 176 that covers substantially the entire length of a ceramic sheath 162. The ceramic sheath 162 may be substantially similar to the ceramic sheath 42 described hereinabove and depicted in FIGS. 3 and 4, or the ceramic sheath 162 may be substantially similar to the ceramic sheath 82 depicted in FIG. 5. The electrically conductive tube 176 has substantially the same material properties as the electrically conductive tube 46 also described hereinabove (depicted in FIGS. 3 and 4) and as the electrically conductive tube 106 described hereinabove (depicted in FIG. 5) and as the electrically conductive tube 126 described hereinabove (depicted in FIG. 6). The electrically conductive tube 176 has an open end 164 and a closed end 170.

The electrically conductive tube 176 has a cylindrically-shaped section 178 and an outside diameter 180. In most embodiments the minimum desirable outside diameter 180 is the same minimum desirable outside diameter previously described for the outside diameter 80 of the electrically conductive tube 46 depicted in FIG. 3.

The electrically conductive tube 176 has a bulbous end 188 at the closed end 170. A bulbous end, such the bulbous end 188, is characterized by a substantially ellipsoid tip 190, a smooth contour transition section 192 between the cylindrically-shaped section 178 of the electrically conductive tube 176 and the ellipsoidal tip 190 and an outside diameter 198 that is larger than the outside diameter 180 of the cylindrically-shaped section 178. The larger outside diameter 198 reduces surface charge accumulation compared with hemispherical shapes on metal tubes, such as the hemispherical shape of the closed end 132 on electrically conductive tube 126 depicted in FIG. 6.

The amount of surface charge accumulating on an outside surface of a non-absorbing hemispherical shape is proportional to $r^3/\lambda$ where r is the radius of the hemisphere and $\lambda$ is the wavelength of the RF field. To overcome the cubic dependency of concentration of surface charges on the radius of a hemisphere, the minimum desirable outside diameter 198 of the bulbous end 188 may, for example, be two times, four times, six times, eight times, twelve times, thirty two times, or even a higher multiple of the outside diameter 198 of the cylindrically-shaped section 178. This means that the outside diameter 180 may, for example, be ½ inch, or ¾ inch, or one (1) inch, or 1½ inch, or 2 inches, or even larger. The minimum desirable outside diameters (e.g., 198) of bulbous ends (e.g., 188) cited in this paragraph typically provide adequate tolerance for surface charge accumulation that are most likely to be encountered in thermocouple applications over the radio frequency range.

As a general rule, as the frequency decreases or RF energy increases, the closed end 170 that is exposed to the energy is preferably shaped more like a sphere and the outside diameter 180 of the cylindrically shaped section 178 and the outside diameter 198 of the bulbous end 188 are increased to minimize the effect of those elements in concentrating the RF field.

Figure 8:
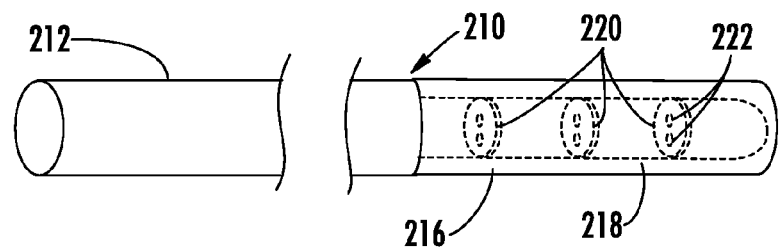
FIG. 8 illustrates a somewhat schematic side view of an embodiment of a thermocouple shield without an integral thermocouple.

FIG. 8 illustrates an embodiment of a thermocouple shield 210 that may be provided for use with a thermocouple (such as thermocouple 10 of FIG. 1) or for use with a thermocouple probe (such as thermocouple probe 30 of FIG. 2). Thermocouple shield 210 includes a ceramic sheath 212 and a electrically conductive tube 216 having a bore 218. In this embodiment of FIG. 8 the ceramic sheath 212 does not extend into the electrically conductive tube 216. In some embodiments it is helpful in order to prevent electrical short circuiting of thermocouple leads to employ spacers 220 with feed-through passageways 222 for thermocouple leads that will prevent the thermocouple leads from touching the bore 218. A spacer 220 is an example of an electrical insulator configured for preventing at least a portion of a thermocouple device from touching a bore (such as the bore 218 illustrated in FIG. 8).

In embodiments where a bore does not include a ceramic sheath or a ceramic spacer insulator, the bore is referred to as an "un-insulated bore." A thermocouple device may be disposed in an un-insulated bore and the thermocouple device may be affixed to the bore by a bonding material and the bore is still an "un-insulated bore." An un-insulated bore is sometimes used with a bare thermocouple that already includes insulation on its leads.

In some embodiments a full-length ceramic sheath (such as the ceramic sheath 42 depicted in FIG. 3) may be used in place of the ceramic sheath 212 depicted in FIG. 8. In some embodiments a perforated electrically conductive tube (such as the electrically conductive tube 126 depicted in FIG. 6) may be used in place of the electrically conductive tube 216 of FIG. 8, or a bulbous electrically conductive tube (such as the electrically conductive tube 176 depicted in FIG. 7) may be used.

Figure 9:
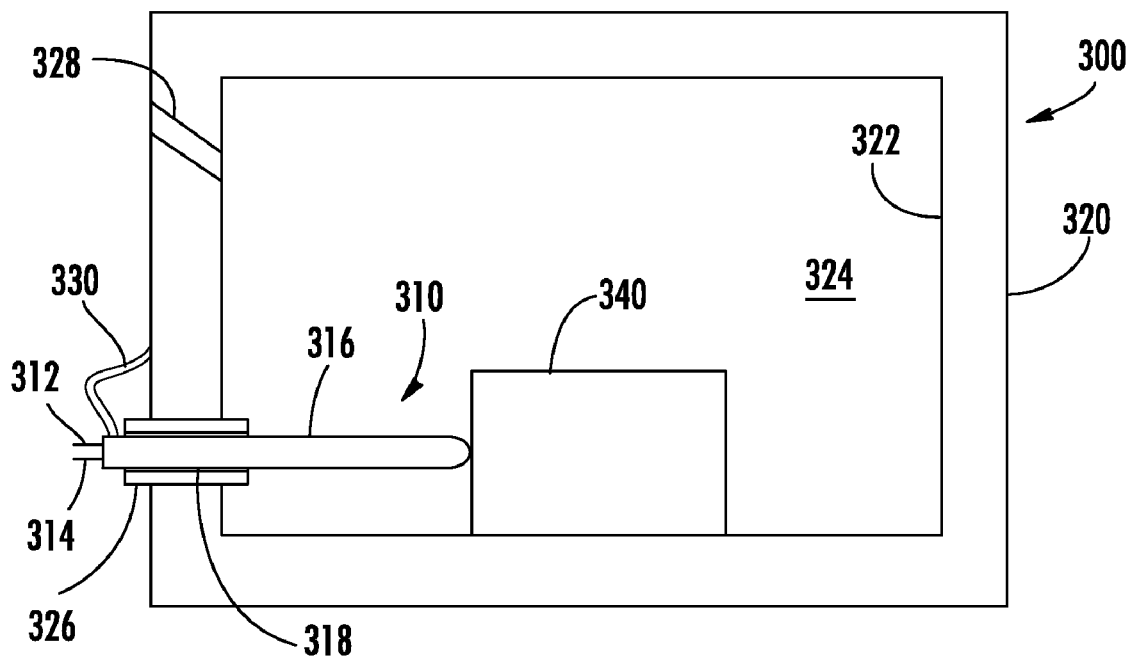
FIG. 9 provides a somewhat schematic side view of an embodiment of a shielded thermocouple installed in a microwave applicator.

FIG. 9 illustrates an embodiment of a microwave applicator 300 that has a built in shielded thermocouple 310. The shielded thermocouple 310 has a first and a second lead 312 and 314, respectively. An electrically conductive tube 316 of the shielded thermocouple 310 has a mounting surface 318. The microwave applicator 300 has an exterior enclosure 320 and an interior compartment 322. The interior compartment 322 forms a microwave chamber 324. The microwave chamber 324 is an example of an RF processing chamber. The shielded thermocouple 310 passes through an electrically conductive port 326 that penetrates the exterior enclosure 320 and the interior compartment 322. The electrically conductive port 326 may be a metal cylinder or may comprise a feature, such as a metal element, that provides substantially zero electrical resistance between the exterior enclosure 320 and the interior compartment 322.

It is generally important that the electrically conductive tube 316 be electrically connected with substantially zero electrical resistance to the interior compartment 322 of the microwave applicator 300. In the embodiment of FIG. 9 such electrical connectivity may be achieved by configuring the mounting surface 318 of the electrically conductive tube 316 for a slight interference fit with the electrically conductive port 326 such that there is a substantially zero electrical resistance from the mounting surface 318 of the electrically conductive tube 316 through the electrically conductive port 326 to the interior compartment 322. In embodiments where a non-conductive port is substituted for the electrically conductive port 326, the interior compartment 322 may be electrically connected through a substantially zero resistance interconnection 328, and a grounding strap 330 may be physically and electrically connected from the electrically conductive tube 316 to the exterior enclosure 320. In embodiments where there is no substantially zero resistance electrical connection between the exterior enclosure 320 and the interior compartment 322, the grounding strap 330 may be disposed inside the microwave chamber 324 and physically and electrically connected between the electrically conductive tube 316 and the interior compartment 322.

A feature of a thermocouple shield, such as an exterior surface of an electrically conductive tube that is sized for an interference fit with an electrically conductive port such that the electrically conductive tube is electrically coupled with the electrically conductive port, or such as a grounding strap that is electrically coupled with an electrically conductive tube, is referred to herein as a "grounding connection" for a thermocouple shield. A reference herein to a first recited element being "electrically coupled with" a second recited element refers to an electrical connection between the recited elements either directly or indirectly through one or more intermediate elements in a manner wherein there is substantially zero electrical resistance through the electrical connection.

In the embodiment of FIG. 9, the shielded thermocouple 310 is positioned to touch a workpiece 340 that is disposed in the microwave chamber 324 for microwave heating. In alternative embodiments the shielded thermocouple 310 may be disposed unbounded in the microwave chamber 324 where it may be used to measure the temperature of the ambient environment.

Figure 10:
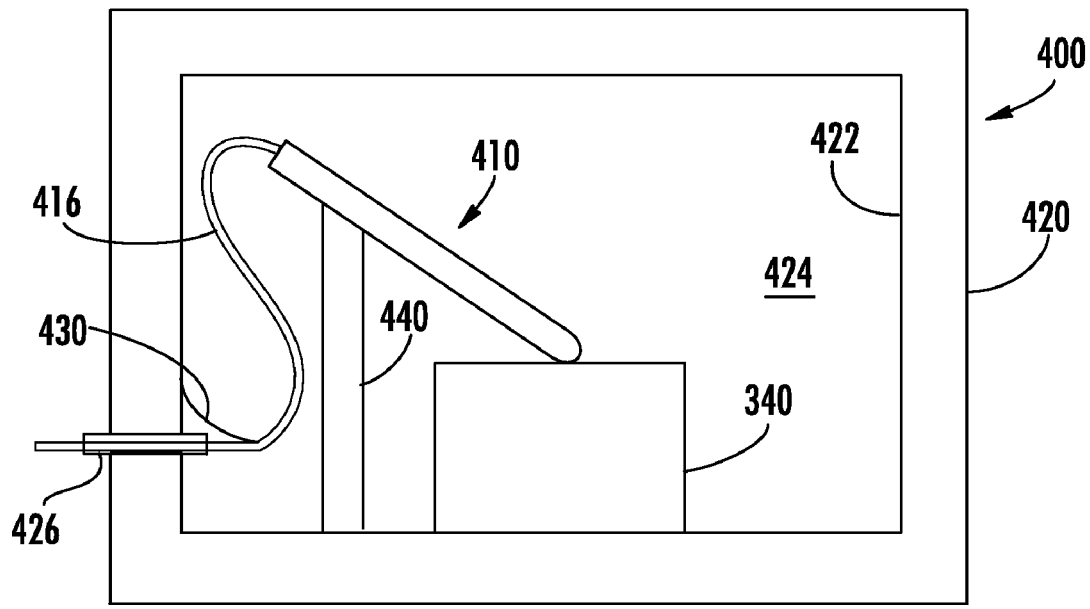
FIG. 10 provides a somewhat schematic side view of an embodiment of a shielded thermocouple and a microwave applicator.

FIG. 10 illustrates an embodiment of a microwave applicator 400 with a shielded thermocouple 410 with a thermally insulated lead jacket 416. The microwave applicator 400 has an exterior enclosure 420 and an interior compartment 422. The interior compartment 422 forms a microwave chamber 424. The microwave chamber 424 is an example of an RF processing chamber. The thermally insulated lead jacket 416 of the shielded thermocouple 410 passes through a passageway 426 that penetrates the exterior enclosure 420 and the interior compartment 422.

In the embodiment of FIG. 10 a grounding strap 430 that forms a portion of the thermally-insulated lead jacket 416 is physically and electrically connected to the exterior enclosure 420. The shielded thermocouple 410 is supported by a brace 440 and is positioned to touch a workpiece 340 that is disposed in the microwave chamber 424 for microwave heating.

Various embodiments described herein provide several advantages. For example, the typical embodiments substantially prevent the RF energy from affecting the tip of the thermocouple, coupling to the thermocouple junction, and/or developing an electrical charge that could affect performance of the thermocouple. Various embodiments are both flexible and adaptable to a wide range of thermocouple types and a wide range of temperatures and furnace atmospheres. Since the thermocouple shield and thermocouple probe may be chosen separately for a specific application, it becomes relatively easy to adapt a standard thermocouple probe and a standard configuration of a thermocouple shield for a custom application.

Because many varying and differing embodiments may be made within the scope of the inventive concept herein taught and because many modifications may be made in the embodiments herein detailed in accordance with the descriptive requirement of the law, it is to be understood that the details herein are to be interpreted as illustrative and not in a limiting sense.

It is also understood that the concepts and configurations which are incorporated into embodiments described herein for shielding a thermocouple probe may often be applied with equal effectiveness to shield a bare thermocouple that will operate in RF fields. Furthermore, concepts and configurations which are incorporated into embodiments described herein for shielding a bare thermocouple may often be applied with equal effectiveness to shield a thermocouple probe.

The foregoing descriptions of embodiments of this invention have been presented for purposes of illustration and exposition. They are not intended to be exhaustive or to limit the invention to the precise forms disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A thermocouple shield for shielding a thermocouple device from a radio frequency field at an operating temperature "T," the thermocouple device having a maximum width "W" and having a thermocouple junction with a length "L," the thermocouple shield comprising:
    an electrically conductive tube having at least minimal structural integrity at the temperature "T," the electrically conductive tube having—
        a substantially cylindrically-shaped section and a closed end and an open end, the cylindrically-shaped section having an outside diameter greater than approximately two times "W," and
        an un-insulated bore with a bore diameter not less than approximately "W" and with a bore length greater than approximately two times "L."

2. The thermocouple shield of claim 1 wherein the bore length is greater than ten times "L."

3. The thermocouple shield of claim 1 wherein the thermocouple shield is configured for shielding a thermocouple device from a radio frequency field in an RF processing chamber, and the thermocouple shield further comprises an electrical connection for electrically coupling the electrically conductive tube with at least a portion of the RF processing chamber.

4. The thermocouple shield of claim 1 wherein the radio frequency field has a frequency and the electrically conductive tube comprises at least one perforation having a size less than a waveguide-beyond-cutoff dimension at the frequency of the radio frequency field.

5. The thermocouple shield of claim 1 wherein the closed end of the electrically conductive tube further comprises a bulbous end having a diameter of at least approximately two times the outside diameter of the cylindrically-shaped section.

6. The thermocouple shield of claim 1 further comprising a bonding material for attaching the thermocouple device to the electrically conductive tube.

7. A thermocouple shield for shielding a thermocouple probe from a radio frequency field having a frequency, where the thermocouple probe comprises an electrically conductive jacket having a tip end surrounding a thermocouple junction, and where the thermocouple probe has a maximum diameter "D," the thermocouple shield comprising:
    an electrically conductive tube having a tube bore, a generally hemispherical-shaped closed end and an open end, wherein the electrically conductive tube comprises at least one perforation having a size less than a waveguide-beyond-cutoff dimension at the frequency of the radio frequency field; and
    a ceramic sheath disposed within the tube bore, the ceramic sheath having a sheath bore with a sheath-bore inside diameter not less than "D;" wherein:
    the thermocouple probe is disposed within the sheath bore.

8. The thermocouple shield of claim 7, wherein the ceramic sheath is formed from one or more materials selected from the group of ceramics consisting of nitride, silicide, boride, phosphide, and sulphide ceramics.

9. The thermocouple shield of claim 7, wherein the electrically conductive tube is disposed around only a portion of the ceramic sheath.

10. The thermocouple shield of claim 7, wherein the electrically conductive tube is disposed around substantially the entire ceramic sheath.

11. The thermocouple shield of claim 7, wherein the closed end of the electrically conductive tube comprises a bulbous end.

12. A shielded thermocouple assembly for use in an RF processing chamber having a radio frequency field, the shielded thermocouple assembly comprising:
    a thermocouple having a thermocouple junction;
    a ceramic sheath surrounding at least a portion of the thermocouple, the ceramic sheath being electrically insulating and substantially transparent to the radio frequency field;
    an electrically conductive tube disposed around the thermocouple junction and disposed around at least a portion of the ceramic sheath wherein the electrically conductive tube comprises at least one perforation having a size less than a waveguide-beyond-cutoff dimension at the frequency of the radio frequency field; and an electrical connection configured for electrically coupling the electrically conductive tube with the RF processing chamber.

13. The shielded thermocouple assembly of claim 12 wherein the ceramic sheath is formed from one or more materials selected from the group of ceramics consisting of nitride, silicide, boride, phosphide, and sulphide ceramics.

14. The shielded thermocouple assembly of claim 12 wherein the thermocouple assembly further comprises leads connected to the thermocouple junction, where the leads are surrounded by a shielding material that is electrically coupled to the RE processing chamber.

15. The shielded thermocouple assembly of claim 12 wherein the electrically conductive tube is disposed around substantially the entire ceramic sheath.

16. The shielded thermocouple assembly of claim 12 wherein the electrically conductive tube comprises a bulbous end.

17. The shielded thermocouple assembly of claim 12 wherein the electrically conductive tube has an outside diameter greater than approximately one-half inch.

18. The shielded thermocouple assembly of claim 12, wherein the electrically conductive tube is disposed around only a portion of the ceramic sheath.

* * * * *